(12) United States Patent
Tanibata

(10) Patent No.: US 12,020,343 B2
(45) Date of Patent: Jun. 25, 2024

(54) VEHICLE DEVICE AND VEHICLE DEVICE CONTROL METHOD

(71) Applicant: DENSO CORPORATION, Kariya (JP)

(72) Inventor: Nobuhiko Tanibata, Kariya (JP)

(73) Assignee: DENSO CORPORATION, Kariya (JP)

(*) Notice: Subject to any disclaimer, the term of this patent is extended or adjusted under 35 U.S.C. 154(b) by 441 days.

(21) Appl. No.: 17/504,917

(22) Filed: Oct. 19, 2021

(65) Prior Publication Data

US 2022/0032775 A1 Feb. 3, 2022

Related U.S. Application Data

(63) Continuation of application No. PCT/JP2020/015034, filed on Apr. 1, 2020.

(30) Foreign Application Priority Data

Apr. 22, 2019 (JP) .................. 2019-081094

(51) Int. Cl.
| | |
|---|---|
| *G06T 1/20* | (2006.01) |
| *B60W 50/14* | (2020.01) |
| *G06T 1/60* | (2006.01) |
| *G09G 5/39* | (2006.01) |

(52) U.S. Cl.
CPC .............. *G06T 1/20* (2013.01); *B60W 50/14* (2013.01); *G06T 1/60* (2013.01); *G09G 5/39* (2013.01); *B60W 2050/146* (2013.01)

(58) Field of Classification Search
CPC . B60W 50/14; B60W 2050/146; B60K 35/00; B60K 35/10; B60K 35/22; B60K 35/81; B60K 2360/11; G06T 1/20; G06T 1/60; G06T 11/00; G09G 3/20; G09G 5/00; G09G 5/36; G09G 5/377; G09G 5/39
USPC ..................................................... 345/545
See application file for complete search history.

(56) References Cited

U.S. PATENT DOCUMENTS

| | | | |
|---|---|---|---|
| 9,672,584 B2 * | 6/2017 | Metcalfe ................. | G06T 1/60 |
| 2012/0133659 A1 | 5/2012 | Masnikosa et al. | |
| 2013/0249779 A1 | 9/2013 | Harada et al. | |
| 2015/0248742 A1 * | 9/2015 | Yamamoto ............... | G09G 5/18 345/522 |
| 2017/0109859 A1 * | 4/2017 | Singh ....................... | G09G 3/20 |
| 2017/0213526 A1 | 7/2017 | Hara et al. | |

FOREIGN PATENT DOCUMENTS

| | | |
|---|---|---|
| JP | 2013195861 A | 9/2013 |
| JP | 2013546025 A | 12/2013 |
| JP | 2016039508 A | 3/2016 |

\* cited by examiner

*Primary Examiner* — Jacinta M Crawford
(74) *Attorney, Agent, or Firm* — Harness, Dickey & Pierce, P.L.C.

(57) ABSTRACT

A vehicle device includes an application as a determiner configured to determine whether a frame buffer has been updated. The application is further configure to set a determination region, prepare a determination image to be drawn in the determination region, request a GPU to draw the prepared determination image, read the determination image that is actually drawn in the frame buffer by the GPU, and determine that the frame buffer has been updated when the prepared determination image matches the read determination image.

10 Claims, 14 Drawing Sheets

VEHICLE DEVICE AND VEHICLE DEVICE CONTROL METHOD

CROSS REFERENCE TO RELATED APPLICATIONS

This application is a continuation application of International Patent Application No. PCT/JP2020/015034 filed on Apr. 1, 2020, which designated the U.S. and claims the benefit of priority from Japanese Patent Application No. 2019-081094 filed on Apr. 22, 2019. The entire disclosure of all of the above application is incorporated herein by reference.

TECHNICAL FIELD

The present disclosure relates to a vehicle device and a vehicle device control method.

BACKGROUND ART

A vehicle device is generally provided with a display device. In such a vehicle device, when a problem occurs in display, it is necessary to solve the problem. For example, it is detected whether a problem has occurred in the display by comparing identification information of frames.

SUMMARY

In one aspect of the present disclosure, a vehicle device connected to a display device includes a graphic processing unit configured to draw a content based on a drawing request from an application program, a synthesizer configured to paste the drawn content to a frame buffer that is provided corresponding to the display device, and a determiner configured to determine whether the frame buffer has been updated.

The synthesizer is further configured to set a pasting region to be pasted to the frame buffer, divide the set pasting region into triangular unit regions, and cause the graphic processing unit to execute processing of pasting each of the unit regions to the frame buffer. The determiner is further configure to set a determination region in the pasting region, prepare a determination image to be drawn in the determination region, request the graphic processing unit to draw the prepared determination image, read the determination image that is actually drawn in the frame buffer by the graphic processing unit, and determine that the frame buffer has been updated when the prepared determination image matches the read determination image.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Figure 1:
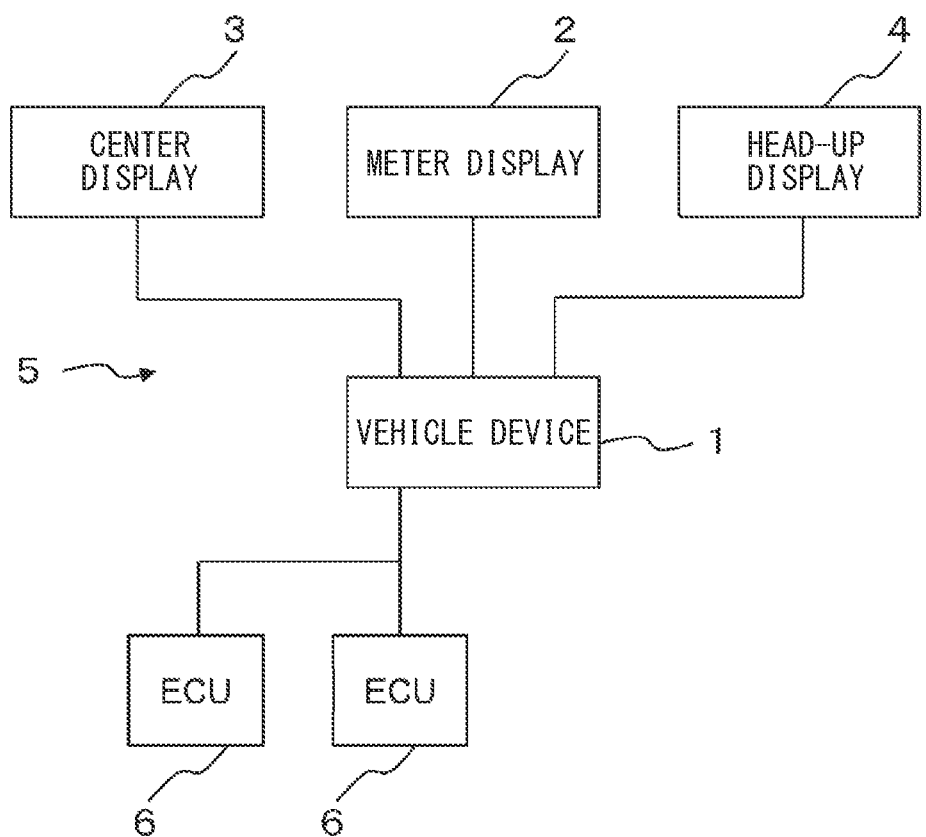
FIG. 1 is a diagram showing a configuration example of a cockpit system according to a first embodiment.

To begin with, a relevant technology will be described first only for understanding the following embodiments.

As described above, even if it is detected that the frames are not the same frame, it may not necessarily be said that there is no problem in the display. For example, when the image itself to be displayed on the display device is not correctly written, even if the video signals output from the display device are not in the same frame, the same image is output as a result, and a problem occurs in the display. In this case, it is considered that it is possible to determine whether the display has been updated by comparing a currently displayed image to a previously displayed image.

However, in recent years, an increase in size of a display device and an increase in definition of a display device have been advanced, and multiple display devices may be controlled by one vehicle device. In this case, if an entire screen is compared, the processing time for the determination becomes long, and another problem may occur. For example, display requiring a periodic update may not be in time or display on another display device may be delayed.

On the other hand, if a configuration is adopted in which, for example, a part of the screen is compared in order to shorten the processing time, although it is possible to determine whether the compared part has been correctly updated, it is not possible to determine whether the entire screen is correctly updated.

One objective of the present disclosure is to provide a vehicle device and a vehicle device control method that can determine whether an entire screen has been updated while reducing processing time.

As described above, in one aspect of the present disclosure, a vehicle device connected to a display device includes a graphic processing unit configured to draw a content based on a drawing request from an application program, a synthesizer configured to paste the drawn content to a frame buffer that is provided corresponding to the display device, and a determiner configured to determine whether the frame buffer has been updated.

The synthesizer is further configured to set a pasting region to be pasted to the frame buffer, divide the set pasting region into triangular unit regions, and cause the graphic processing unit to execute processing of pasting each of the unit regions to the frame buffer. The determiner is further configure to set a determination region in the pasting region, prepare a determination image to be drawn in the determination region, request the graphic processing unit to draw the prepared determination image, read the determination image that is actually drawn in the frame buffer by the graphic processing unit, and determine that the frame buffer has been updated when the prepared determination image matches the read determination image.

As described above, by comparing the prepared determination image to the determination image that is actually drawn in the frame buffer, it is possible to determine whether writing is actually executed on the frame buffer. If writing is correctly executed on the frame buffer, it can be determined that there is no problem that the screen is stuck.

At this time, in the vehicle device, the determination image is drawn in the determination region set in the pasting region. Accordingly, it is possible to reduce the number of pixels to be compared, and to greatly reduce the processing time as compared to a case in which the entire screen is compared. Therefore, it is possible to determine whether the entire screen has been updated while reducing the processing time.

Hereinafter, multiple exemplary embodiments will be described with reference to the drawings. In the following description, the same reference numerals are given to substantially the same portions according to the embodiments.

First Embodiment

Next, the first embodiment will be described. As shown in FIG. 1, the vehicle device 1 constitutes, for example, a cockpit system 5 including three display devices which are a meter display 2, a center display 3, and a head-up display 4. However, the number, the arrangement, or the configuration of the display devices is merely an example, and the disclosure is not limited thereto. Although FIG. 1 shows an example in which the vehicle device 1 is connected to multiple display devices, the number of display devices connected to the vehicle device 1 may be one or more.

The meter display 2 is, for example, a liquid crystal display or an organic EL display, and is assumed to be provided in the vicinity of the front of a driver on a dashboard. That is, the meter display 2 is provided at a position that is easily visible to the user, in other words, at a position that is within the field of view of the user during normal driving.

The center display 3 is, for example, a liquid crystal display or an organic EL display, and is assumed to be provided in the vicinity of a center console. As will be described later, the meter display 2 can display a speed, a warning, and the like in so-called full graphic display.

The head-up display 4 is, for example, a liquid crystal display, an organic EL display, or a projector that projects an image onto a front window, and is assumed to be provided in the vicinity of the front of the driver on the dashboard. That is, the meter display 2 is provided at a position that is easily visible to the user, in other words, at a position that is within the field of view of the user during normal driving.

The vehicle device 1 is communicably connected to some electronic control devices 6 (hereinafter referred to as ECUs 6) provided in a vehicle. Although the vehicle device 1 can also be considered as one of the ECUs 6, in the present specification, the vehicle device 1 and the ECU 6 are separated from each other in order to facilitate understanding. The number of ECUs 6 connected to the vehicle device 1 is an example, and the present disclosure is not limited thereto.

Figure 2:
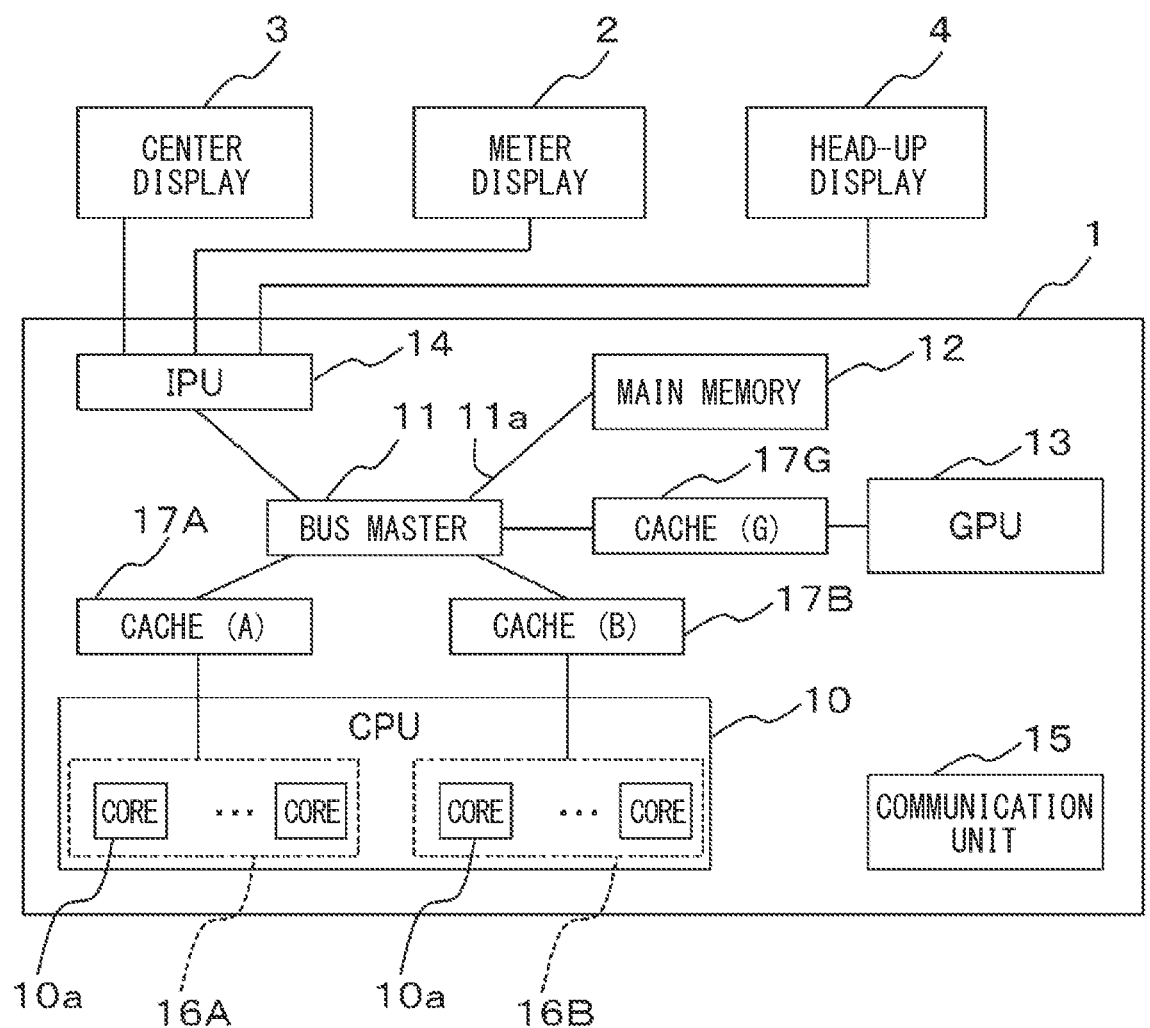
FIG. 2 is a diagram showing an electrical configuration example of a vehicle device.

As shown in FIG. 2, the vehicle device 1 includes a CPU 10, a bus master 11, a main memory 12, a graphic processing unit 13 (hereinafter, referred to as a GPU 13), an image processing unit 14 (hereinafter, referred to as an IPU 14), a communication unit 15, and the like.

The GPU 13 is a functional unit that actually draws a content requested by an application program (hereinafter, referred to as an application). That is, a drawing request, which will be described later, is received from the application to the GPU 13, and the GPU 13 draws the actual contents based on the drawing request. As will be described later, the GPU 13 performs attachment of content to a frame buffer, drawing of a determination image, and the like based on a request from a synthesizer.

The IPU 14 is a functional unit that reads the frame buffer and outputs the frame buffer to the display device as a video signal. That is, the content drawn on the frame buffer by the IPU 14 is transferred to the display device, and thereby the content is displayed on the display device. The IPU 14 does not need to output the content in the form of a video signal, and can be configured to output the content in a form of data and reproduce the content on a display device side.

The CPU 10 includes multiple, for example, eight cores 10a. The eight cores 10a are grouped by each four cores, and are allocated to two CPU modules 16A and 16B. That is, a plurality of CPU modules 16 capable of operating independently of one another in terms of functions are provided in the vehicle device 1.

The CPU module 16A is allocated to an application group 22A that relatively requires a real-time property, and the CPU module 16B is allocated to an application group 22B that does relatively not require the real-time property. Hereinafter, when a description common to the CPU module 16 is given, the CPU module 16 is simply referred to as the CPU module 16 without adding A or B.

Each of the CPU modules 16 and the GPU 13 is provided with a respective dedicated cache memory 17. Hereinafter, a unit provided for the CPU module 16A is referred to as a cache 17A for the sake of convenience, a unit provided for the CPU module 16B is referred to as a cache 17B for the sake of convenience, and a unit provided for the GPU 13 is referred to as a cache 17G for the sake of convenience. The cache memories 17 are connected to the main memory 12 and the IPU 14 via a bus 11a and the bus master 11, respectively, and are capable of transmitting and receiving data to and from the main memory 12 and the IPU 14.

The communication unit 15 communicates with another ECU 6. The communication unit 15 includes, for example, a controller area network interface. Depending on a type of the ECU 6, for example, a wireless communication method such as Wi-Fi or a wired communication method such as USB may be adopted.

Figure 3:
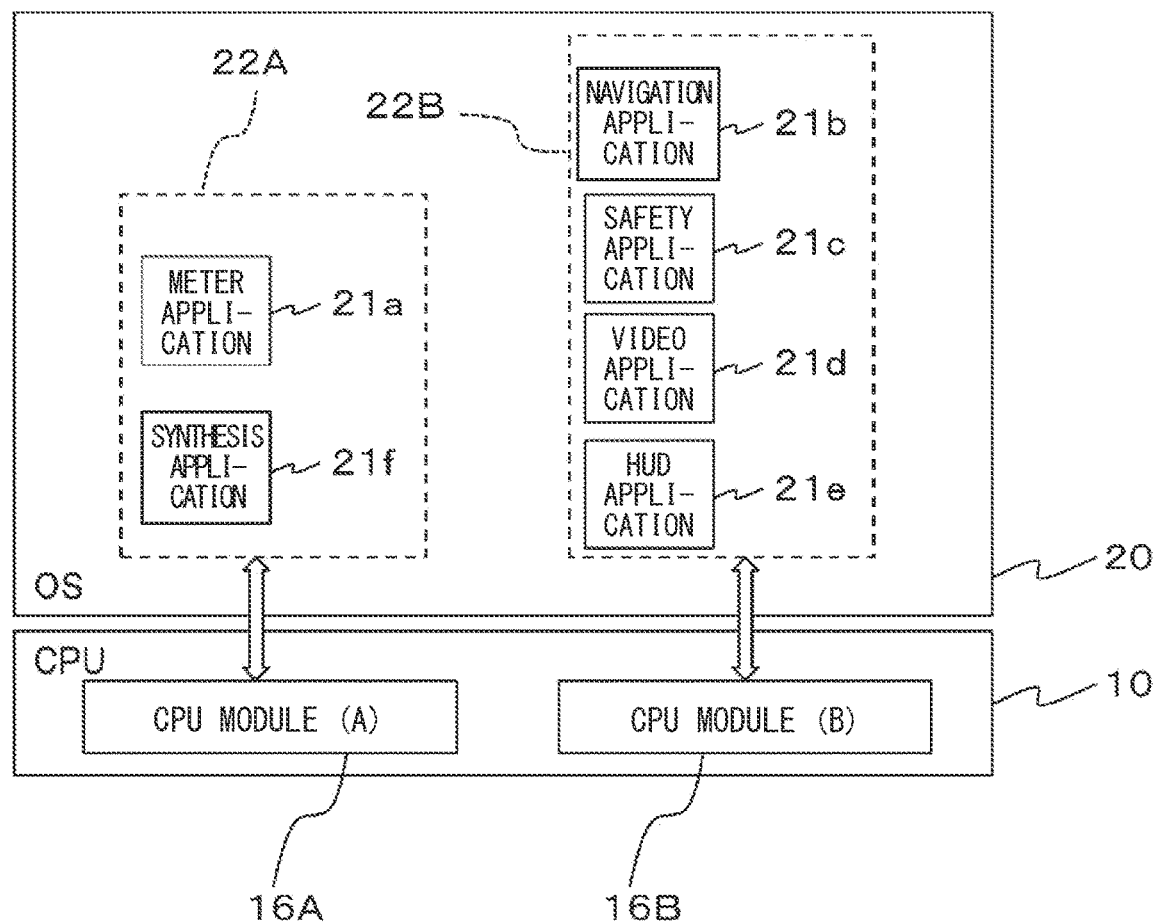
FIG. 3 is a diagram showing a software configuration example of the vehicle device.

As shown in FIG. 3, in the vehicle device 1, an operating system 20 (hereinafter, referred to as an OS 20) is executed on the CPU 10, and multiple applications 21 are executed on the OS 20. As the applications 21 executed on the OS 20, a meter application 21a, a navigation application 21b, a safety application 21c, a video application 21d, an HUD application 21e, a synthesis application 21f, and the like are provided. HUD is an abbreviation for head up display. The applications 21 are an example, and the applications 21 executed on the OS 20 are not limited thereto.

The meter application 21a notifies a user of a speed, the number of revolutions, a warning, or the like of the vehicle, and mainly draws the contents displayed on the meter display 2. For example, the meter application 21a draws, as the user interface 23 shown as a normal display mode in FIG. 4, the content such as a speedometer M1 and a tachometer M2 serving as meters, or a warning light M3 also called a tertail.

As described above, the GPU 13 actually draws the content, and the meter application 21a prepares drawing contents such as what content is to be drawn and requests the GPU 13 to actually draw the content. However, in order to simplify the description, it is expressed here that the meter application 21a executes drawing.

The speedometer M1 includes a needle image M1a, the display of which needs to be updated periodically and in real time in order to indicate a change in the speed of the vehicle, and a scale image M1b, the display of which is assumed to be less changed than that of the needle image M1a. Similarly, the tachometer M2 includes an indicator image M2a, the display of which needs to be updated periodically and in real time in order to indicate a change in the number of rotations, and a scale image M1b, the display of which is assumed to be less changed than that of the indicator image M2a. In the case of the meter display 2, a background image MB is drawn in a layer different from the indicator image M1a, the scale image M1b, and the like. The images are examples.

The surface to be drawn by the meter application 21a can also be displayed on the center display 3 or the head-up display 4. The content drawn by the meter application 21a is required to have a relatively higher real-time property as compared with the content drawn by the other exemplified application 21.

The navigation application 21b implements a navigation function and draws a content mainly displayed on the center display 3. For example, as shown in FIG. 5, the navigation application 21b draws a content such as a navigation screen M4 including a map, a current position of the vehicle, and the like. However, the content drawn by the navigation application 21b can be displayed on the meter display 2 as a navigation display mode shown in FIG. 4, for example, and can also be displayed on the head-up display 4.

The safety application 21c implements various functions for displaying the menu and driving support, and draws the content mainly displayed on the center display 3. For example, as shown in FIG. 5, the safety application 21c draws the content such as the home screen M5 in which the multiple icons are arranged for selecting the target function or content. However, the content drawn by the safety application 21c can be displayed on the meter display 2 as a menu display mode shown in FIG. 4, for example, and can also be displayed on the head-up display 4.

Figure 6:
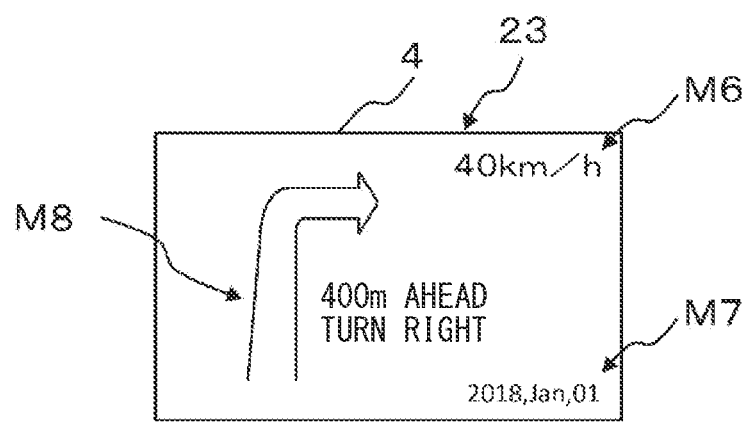
FIG. 6 is a diagram showing an example of a display mode of a head-up display.

The HUD application 21e notifies the user of, for example, a speed and a future course, and mainly draws the contents displayed on the head-up display 4. For example, as shown in FIG. 6, the HUD application 21e draws the content for displaying current speed information M6, time information M7, or course information M8 indicating the distance to the corner, the turning direction, and the like. However, the content drawn by the HUD application 21e can also be displayed on the meter display 2 or the center display 3.

As will be described later, the synthesis application 21f specifies the size and type of the content to be displayed on the display device, and requests the GPU 13 to paste the content into the frame buffer. That is, the synthesis application 21f implements a function as a synthesizer, which is also called a component jitter or the like, together with a GPU driver to be described later and the GPU 13. As will be described later, the synthesis application 21f implements the function as a determiner that determines an update of the frame buffer. The synthesizer and the determiner can also be implemented by different applications 21.

Figure 7:
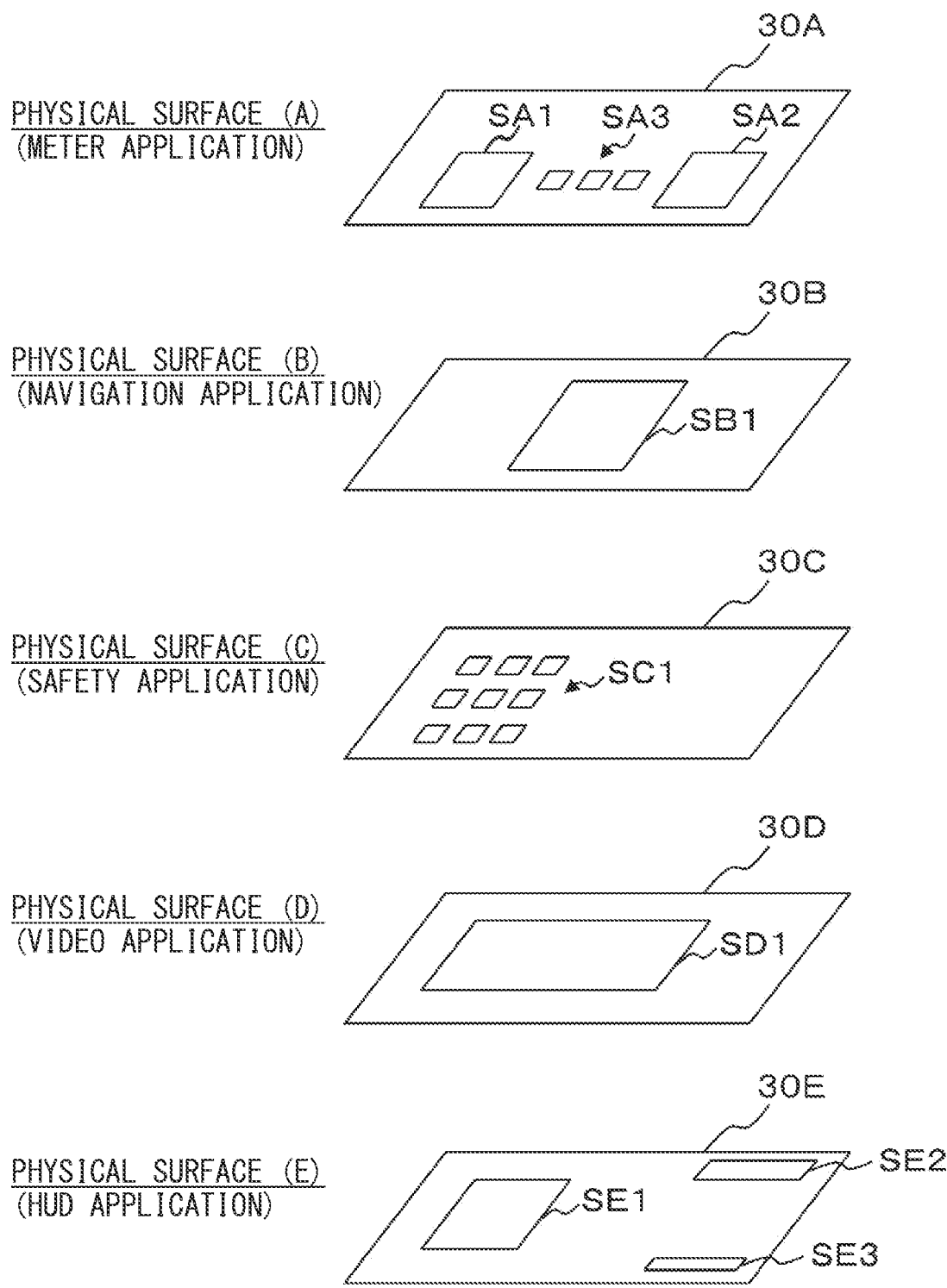
FIG. 7 is a diagram showing an example of a physical surface allocated to each application.

Among the applications 21, the application 21 for drawing the content is individually allocated a physical surface 30 for drawing the content, as shown in FIG. 7. That is, the application 21 functions as a drawing unit that draws the content on the physical surface 30 allocated to the application 21.

The physical surfaces 30 are secured in a size capable of drawing, that is, arranging necessary contents on the main memory 12 and the cache memory 17. A size of the physical surface 30 does not necessarily need to be equal to the number of pixels of the display device. The above is because a necessary content is selected from the content drawn on the physical surface 30 and displayed on the display device.

In the present embodiment, a physical surface 30A is allocated to the meter application 21a, a physical surface 30B is allocated to the navigation application 21b, a physical surface 30C is allocated to the safety application 21c, a physical surface 30D is allocated to the video application 21d, and a physical surface 30E is allocated to the HUD application 21e. Then, one or more contents are drawn on the physical surfaces 30 by the applications 21.

For example, contents SA1 to SA3 are drawn on the physical surface 30A by the meter application 21a. Similarly, a content SB1 is drawn on the physical surface 30B by the navigation application 21b. Contents SC1 and SC2 are drawn on the physical surface 30C by the safety application 21c. In FIG. 7, for simplification of description, multiple contents drawn by the safety application 21c are collectively referred to as the content SC1. A content SD1 is drawn on the physical surface 30D by the video application 21d. Contents SE1 to SE3 are drawn on the physical surface 30E by the HUD application 21e. The contents are examples.

At least one of the contents displayed on the display devices executes an animation operation. Here, the animation operation is a display mode in which a position and a size of an image indicating the content gradually change, the image rotates, the user interface 23 moves as a whole along with a swipe operation, the image gradually fades in or fades out, the color of the image changes, and the like.

Figure 4:
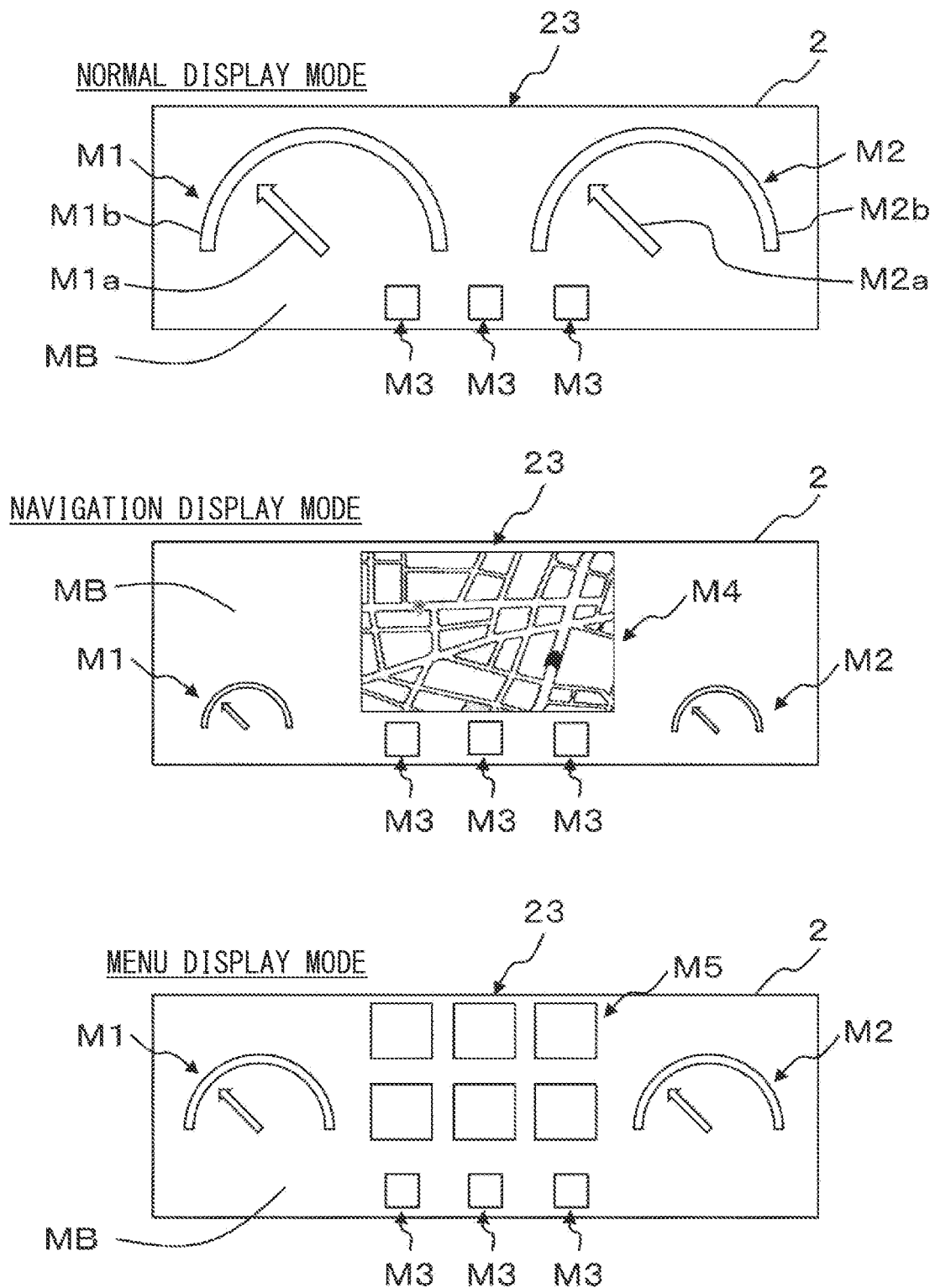
FIG. 4 is a diagram showing an example of a display mode of a meter display.
Figure 5:
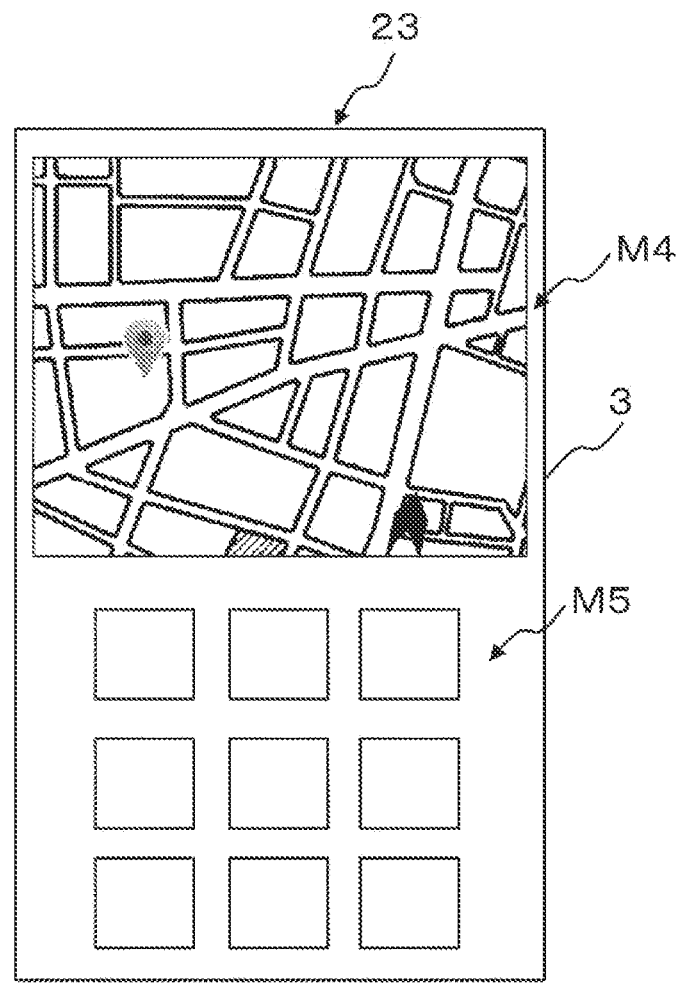
FIG. 5 is a diagram showing an example of a display mode of a center display.

For example, as shown in FIG. 4, the speedometer M1, the tachometer M2, a map, a menu, or the like are a content whose size and position change depending on a display mode or the display device at a display destination. However, the animation operation is not limited thereto, and any animation operation in which the display mode changes continuously or intermittently from a certain time point is included.

Next, an operation of the above-described configurations will be described.

Figure 8:
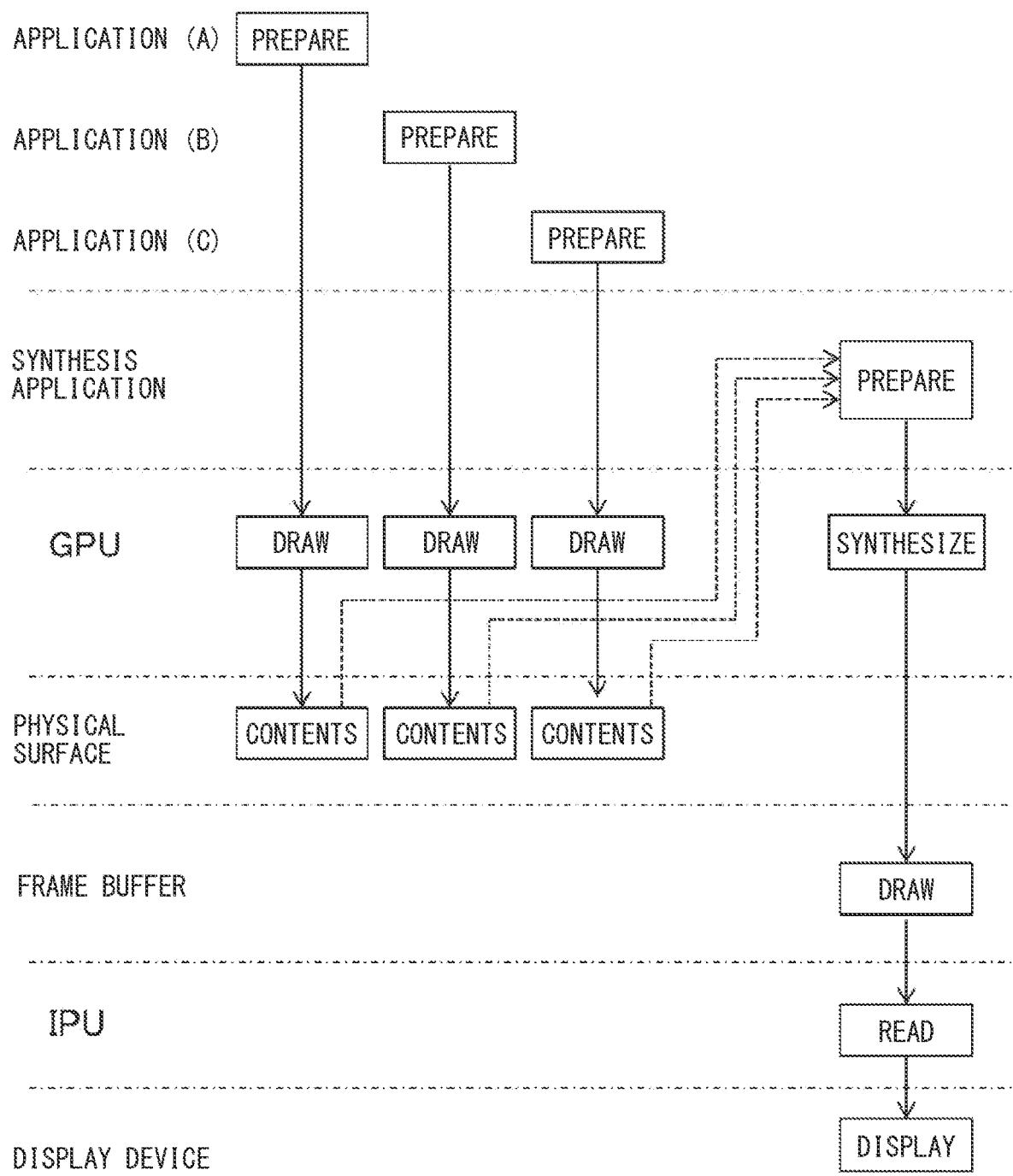
FIG. 8 is a diagram showing a flow from drawing to display.
Figure 9:
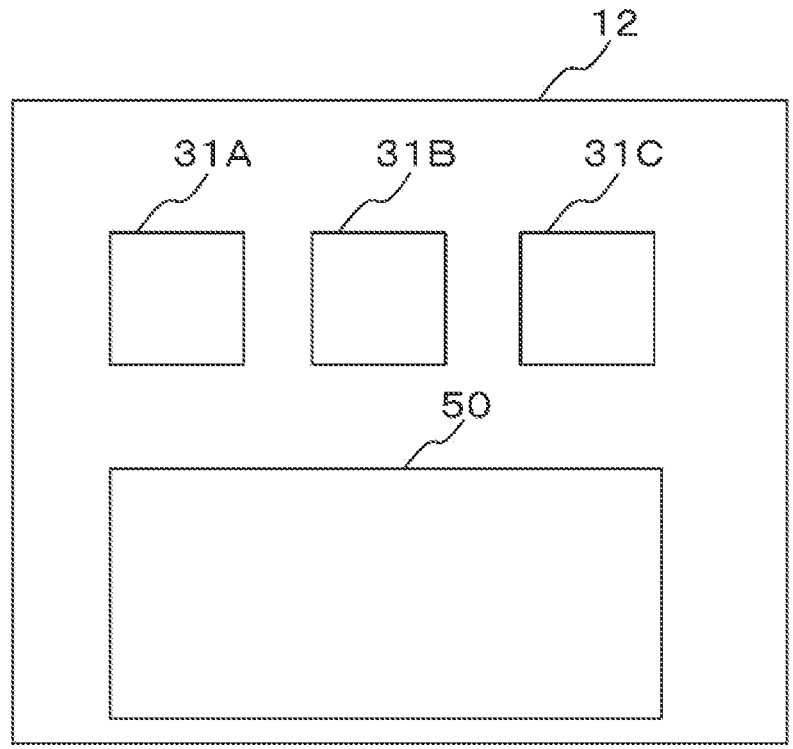
FIG. 9 is a diagram showing a configuration example of a main memory.
Figure 10:
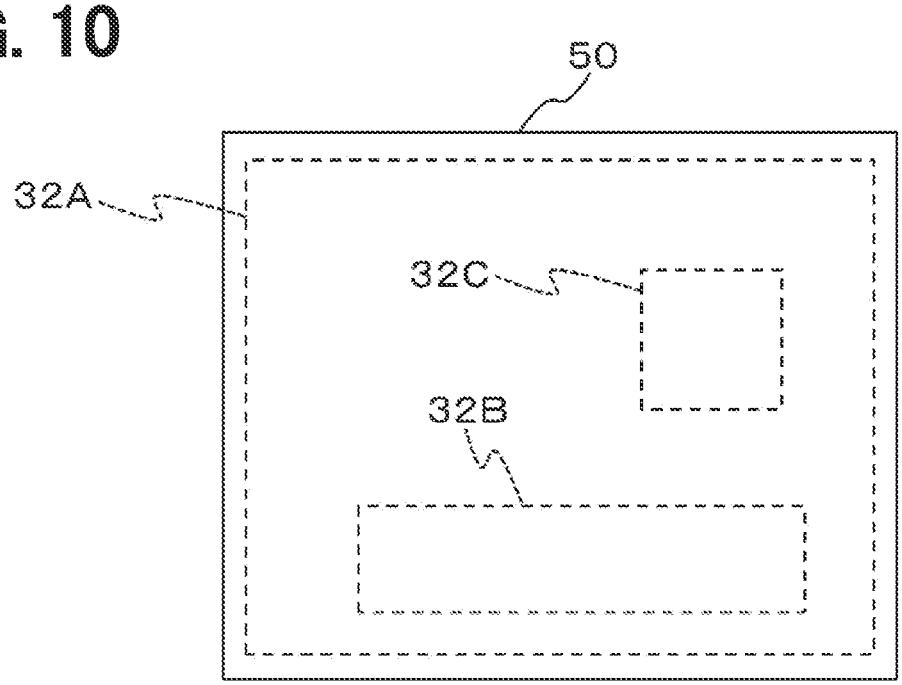
FIG. 10 is a diagram showing a configuration example of a frame buffer.

First, the flow from drawing the content to displaying the content on the display device in the vehicle device 1 will be described with reference to FIGS. 8 to 10. In FIGS. 8 to 10, the application 21 for drawing the content is shown as a drawing application A, a drawing application B, and a drawing application C for convenience. When the description common for each drawing application is given, the drawing application is simply referred to as a drawing application without adding A to C.

When the drawing application prepares the drawing contents, the drawing application requests the GPU 13 to actually execute drawing. Hereinafter, the drawing request to the GPU 13 from the drawing application will be referred to as a drawing request for convenience. The drawing request is individually output to the GPU 13 from each drawing application.

When receiving a drawing request, as shown in FIG. 9, the GPU 13 executes drawing based on the request contents in the drawing region 31A, the drawing region 31B, and the drawing region 31C that are provided on the main memory 12, for example, corresponding to the drawing applications. What is drawn in the drawing regions 31A to 31C is the content. The drawing regions 31A to 31C can be the same region as the physical surface 30, and the physical surface 30 is provided on the cache 17 for high-speed access. The drawing regions 31A to 31C can be provided on the main memory 12 such that the content can be shared when pasted in the frame buffer 50.

When the drawing request from each drawing application is processed, the synthesis application 21f refers to the content corresponding to each drawing application and prepares for pasting in the frame buffer 50 as shown in FIG. 8. In the preparation, by selecting the content to be displayed and setting the position and the size, as shown in FIG. 10, a pasting region 32A to a pasting region 32C for pasting in the frame buffer 50 are set in each drawing region 31. Hereinafter, when the description common for the pasting region 32A to the pasting region 32C is given, the pasting region 32A to the pasting region 32C are simply referred to as the pasting region 32 without adding A, B, and C. The content may be pasted from one drawing region 31.

When this preparation is completed, the synthesis application 21f requests the GPU 13 to paste the paste region 32 into the frame buffer 50, as shown in FIG. 8. Then, the GPU 13 pastes the pasting region 32 into the frame buffer 50 based on the request from the synthesis application 21f. Accordingly, as shown in FIG. 10, the pasting region 32A to the pasting region 32C are combined or superposed, and are drawn at predetermined positions on the frame buffer 50 with predetermined sizes. That is, the content included in the pasting region 32 is arranged in the frame buffer 50.

After that, the IPU 14 reads the content arranged in the frame buffer 50 and outputs the content as a video signal to the display device. Alternatively, the IPU 14 transfers the information of the content arranged in the frame buffer 50 to the display device, and the content is reproduced on the display device side. Accordingly, the content is displayed on the display device.

When the display device is provided as in the vehicle device 1, a display problem may occur. At this time, the display problem includes the case in which writing of the content to the frame buffer 50, that is, the update of the frame buffer 50 is not executed correctly. This is because if the frame buffer 50 is not updated correctly, a problem may occur. For example, the same screen may continue to be displayed or an unintended screen may be displayed. Hereinafter, the problem assumed in the present embodiment is referred to as, for convenience, that the screen is stuck.

In that case, it is considered that it becomes possible to determine whether the screen is stuck by comparing whether the current display screen and the previous display screen are the same. However, when the display device is enlarged or has a high definition, or when multiple display devices are controlled as in the vehicle device 1 according to the present embodiment, if the entire screen is compared, data is frequently exchanged among the CPU 10, the main memory 12 and the GPU 13.

For example, in the case of a so-called full HD display device, the resolution is 1920×1080 pixels, and the processing of comparing all pixels may take approximately 1000 msec, which is an example, as an actually measured value. Therefore, if the entire screen is compared, it is impractical for the meter display 2, for example, which needs to periodically update the display in 1/60 seconds.

If the load of the processing of comparing the entire screen increases, the processing other than the display is also affected, and the performance of the vehicle device 1 is significantly deteriorated, which makes it impractical. On the other hand, in order to shorten the processing time, for example, if a part of the screen region is compared, even if it is possible to determine the compared region, it is not possible to determine whether the entire screen has been updated correctly.

For the vehicle device 1, it is possible to determine whether the entire screen has been updated while restricting the processing time.

First, the inventors have focused on a drawing mechanism when the GPU 13 pastes the content into the frame buffer 50. Specifically, the GPU 13 has a drawing mechanism in which the pasting region 32 requested by the synthesis application 21f is divided into two triangular regions and each triangular region is pasted into the frame buffer 50.

Figure 11:
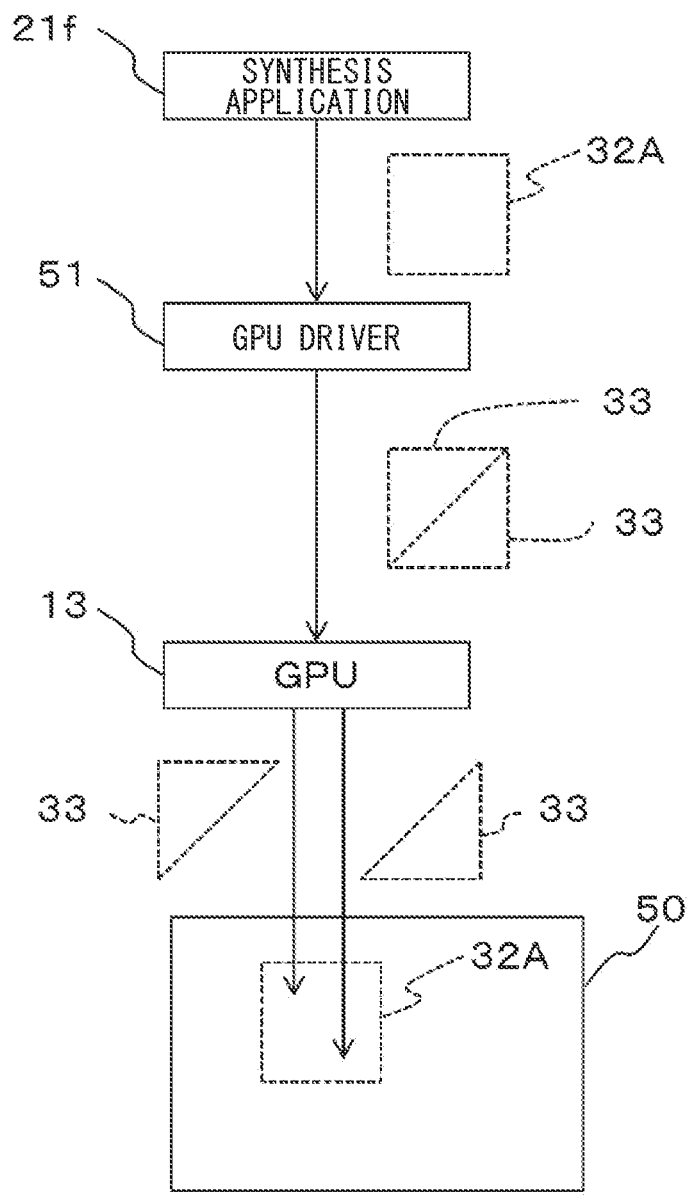
FIG. 11 is a diagram showing details of pasting by a GPU.

More specifically, as shown in FIG. 11, for example, when pasting the pasting region 32A to the frame buffer 50, the synthesis application 21f instructs the pasting region to the GPU driver 51. Then, the GPU driver 51 divides the pasting region 32A into two triangular unit regions 33, and controls the GPU 13 so that each unit region 33 is pasted to the frame buffer 50. Then, the GPU 13 pastes the two unit regions 33 at predetermined positions on the frame buffer 50, so that the entire pasted region 32A is drawn on the frame buffer 50.

It is considered that if it is determined whether each unit region 33 is correctly drawn in the frame buffer 50 based on this drawing mechanism, it can be determined whether the entire screen has been correctly updated. However, when a currently drawn region and a previously drawn region are compared for the entire unit region 33, it takes too much processing time as described above.

Figure 12:
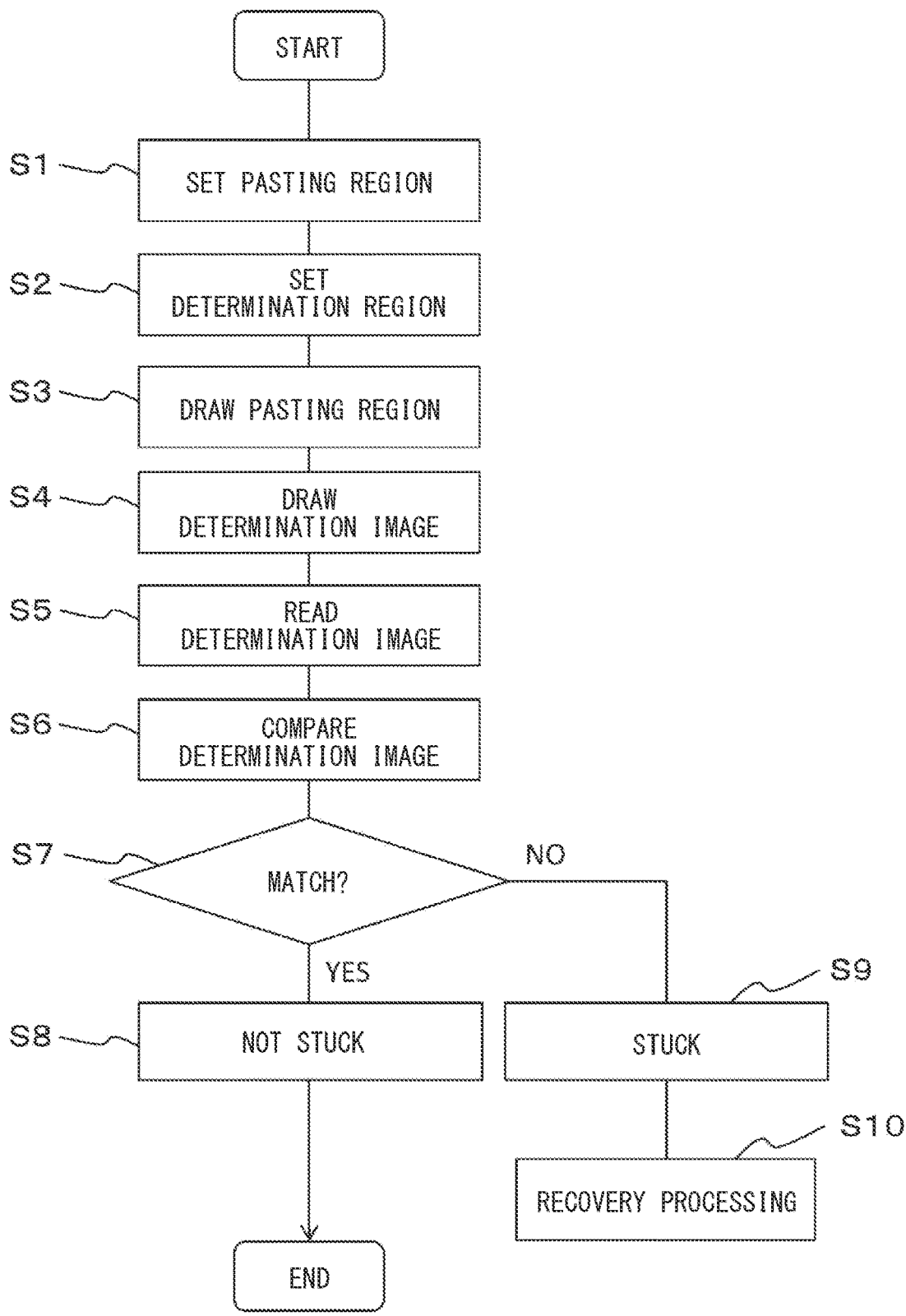
FIG. 12 is a diagram showing a flow of processing of determining an update.

Therefore, the vehicle device 1 executes the processing of determining the update shown in FIG. 12 to achieve both the restriction of the processing time and the determination of the entire screen. Although the following processing is executed by the synthesis application 21f serving as the synthesizer and the determiner, the vehicle device 1 will be mainly described here for the sake of simplification of the description.

When the vehicle device 1 sets the pasting region 32 in step S1, the vehicle device 1 sets the determination region for each pasting region 32 in step S2. The determination region is a region in which a determination image for determining whether the frame buffer 50 is updated correctly is drawn, and is set with one pixel in the pasting region 32 according to the present embodiment. How to set the position and the size of the determination region will be described later.

Then, the vehicle device 1 draws the pasting region 32 in step S3, and draws the determination image in step S4. More specifically, the synthesis application 21f requests the GPU 13 to draw the pasting region 32, and also requests the GPU 13 to draw the determination image prepared in advance. The processing in steps S2 to S4 is in no particular order. Details of the determination image will be described below.

Subsequently, when the drawing executed by the GPU 13 is completed, in step S5, the vehicle device 1 reads out the determination image drawn in each determination region from the frame buffer 50, and in step S6, compares the requested determination image with the determination image actually drawn in the frame buffer 50.

Then, when the requested determination image and the determination image actually drawn in the frame buffer 50 match, the vehicle device 1 determines YES in step S7, and thus determines that the screen is not stuck, that is, the frame buffer 50 has been updated correctly.

On the other hand, when the requested determination image and the determination image actually drawn in the frame buffer 50 do not match, the vehicle device 1 determines NO in step S7, and thus determines in step S9 that the screen is stuck, that is, the frame buffer 50 has not been updated correctly. In this case, the vehicle device 1 executes recovery processing in step S10 to eliminate the sticking of the screen.

The vehicle device 1 also executes the recovery processing even when the drawing itself to the frame buffer 50 fails in steps S3 and S4. In the recovery processing, the OS 20 that has a problem is restarted according to the present embodiment. However, as the recovery processing, for example, the application 21 alone that has a problem can be restarted.

In this way, the vehicle device 1 determines whether the frame buffer 50 has been correctly updated by comparing the determination image intentionally prepared for determination to the determination image actually drawn in the frame buffer 50. In other words, the vehicle device 1 determines whether the content has been correctly written to the frame buffer 50 by comparing the determination images before and after the writing.

By the way, the content drawn in the frame buffer 50 is basically displayed on the display device. Therefore, when the determination image is drawn in the frame buffer 50 as described above, an image that does not need to be shown to the user may be displayed. Therefore, in view of the structure of the display device, the vehicle device 1 sets at least one determination region within the region of the frame buffer 50, which is not visible to the user when displayed on the display device.

Figure 13:
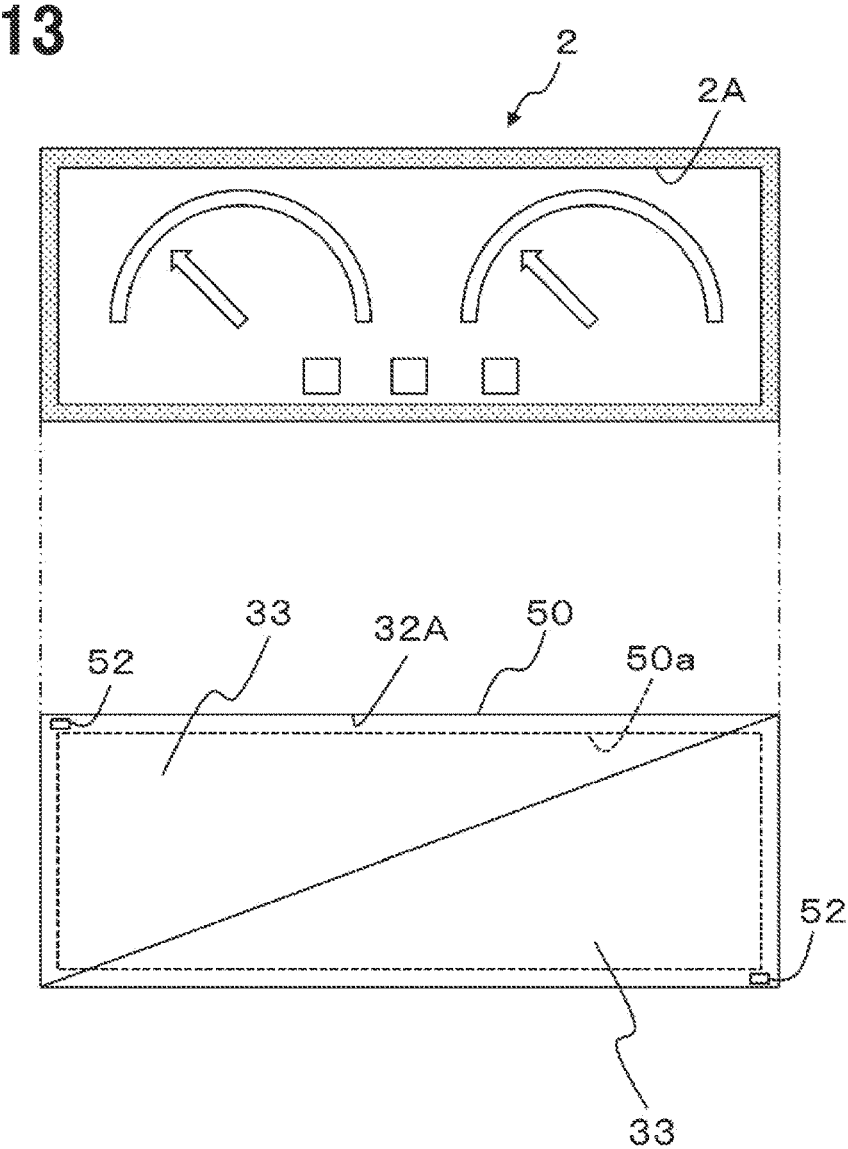
FIG. 13 is a diagram showing a display range of a display device and the frame buffer in comparison with each other.

For example, as shown in FIG. 13, the outer edge portion of the display device such as the meter display 2 is generally covered with a bezel 2a or a frame. In other words, the display device has a structure in which the entire screen is not exposed, that is, is not visible to the user, and the outer edge portion is not visible to the user.

Therefore, in the frame buffer 50 in which the same number of pixels as the display device is secured, a region that can be drawn and is not visible to the user is formed on the outer edge of the frame buffer 50. Hereinafter, the region will be referred to as an invisible region 50a for convenience. Then, within the invisible region 50a, even if the determination image described above is drawn, the determination image is not visible to the user. Similar applies to the center display 3 and the head-up display 4 as long as a liquid crystal panel or an organic EL panel is adopted. The content to be shown to the user is naturally drawn at a position that is not the invisible region 50a.

Therefore, in step S2 described above, the vehicle device 1 sets the determination region 52 in the invisible region 50a formed in the outer edge portion of the frame buffer 50. Accordingly, it is possible to draw the determination image without showing an unnecessary image to the user. Although in FIG. 13, the determination region 52 is shown as a quadrangle for the sake of description, the determination region 52 may be one pixel or more. In the vehicle device 1, at least one, in the present embodiment, two determination regions 52 are set at fixed positions in the invisible region 50a.

At this time, the vehicle device 1 can set the fixed position in the invisible region 50a as the determination region 52. The vehicle device 1 can set a randomly set position in the invisible region 50a as the determination region 52. The vehicle device 1 can set the determination region 52 by mixing the fixed position and the randomly set position in the invisible region 50a.

The vehicle device 1 can set multiple determination regions 52 in one unit region 33 if there is a margin in the processing time. In this case, in step S7, it is determined whether the set determination regions 52 sequentially match. In the vehicle device 1, one determination region 52 can include multiple pixels.

The vehicle device 1 can select a representative color such as red, green, or blue in advance as the color of the determination image, and change and set the color in order for each determination. The vehicle device 1 can set the color of the determination image at random for each determination, but different from that at the time of the previous determination. That is, the determination image may be an image in which at least one of the position, the size, and the color is different from that at the time of the previous determination.

As described above, the vehicle device 1 determines whether the frame buffer 50 has been correctly updated by preparing the determination image, drawing the determination image in the frame buffer 50, comparing the prepared determination image with the actually drawn image, and adopting the control method.

According to the embodiment described above, following effects can be attained.

The vehicle device 1 is connected to a display device, and includes the GPU 13 that draws a content based on a drawing request from the application 21, the synthesis application 21f serving as a synthesizer that attaches the drawn content to the frame buffer 50 provided corresponding to the display device, and the application 21f serving as a determiner that determines whether the frame buffer 50 has been updated.

The synthesis application 21f serving as a synthesizer causes the GPU 13 to execute processing of setting the pasting region 32 to be pasted to the frame buffer 50, dividing the set pasting region 32 into triangular unit regions 33, and pasting each of the unit regions 33 to the frame buffer 50. Then, the synthesis application 21f serving as a determiner sets the determination region 52 in each of the pasting regions 32, prepares a determination image to be drawn in the determination region 52, requests the GPU 13 to draw the prepared determination image, reads the determination image actually drawn in the frame buffer 50 by the GPU 13, and determines that the frame buffer 50 has been updated when the prepared determination image and the read determination image match.

In this way, by comparing the prepared determination image with the determination image actually drawn in the frame buffer 50, it is possible to determine whether writing is actually executed in the frame buffer 50. That is, with this configuration, it is possible to determine whether the frame buffer 50 has been correctly updated. Then, if the frame buffer 50 has been correctly updated, it can be determined that the screen is not stuck.

At this time, in the vehicle device 1, a determination image is drawn in the determination region 52 set in the pasting region 32. Accordingly, it is possible to reduce the number of pixels to be compared, and to greatly reduce the processing time as compared with a case in which the entire screen is compared. Therefore, it is possible to determine whether the entire screen has been updated while restricting the processing time.

It is possible to determine whether the entire screen has been updated while restricting the processing time according to the control method of the vehicle device 1 including a step of setting the pasting region 32 to be pasted to the frame buffer 50, a step of dividing the pasting region 32 into triangular unit regions 33, pasting each unit region 33 to the frame buffer 50 by the GPU 13, a step of preparing a determination image to be drawn in a determination region 52 set in the pasting region 32, a step of drawing the prepared determination image in the frame buffer 50 by the GPU 13, and a step of comparing the prepared determination image with the read determination image and determining that the frame buffer 50 is updated when the prepared determination image matches the read determination image.

The vehicle device 1 sets at least one determination region 52 within the region of the frame buffer 50, which is the invisible region 50a not visible to the user when displayed on the display device. Accordingly, it is possible to draw the determination image in the actually displayed region, and to reliably determine whether writing to the frame buffer 50 has been executed. Since the determination image is not visible to the user even when the determination image is drawn, the user is not given a sense of distrust such as an occurrence of a failure.

The vehicle device 1 sets, as a region that is not visible to the user when displayed on the display device, a region on the frame buffer 50 corresponding to a portion hidden (or covered) by a bezel provided on the display device. Accordingly, it is possible to determine whether the frame buffer 50 is correctly updated for most of the general display devices.

The vehicle device 1 sets the determination region 52 with one pixel. Accordingly, the determination image to be compared is minimized, and it is possible to shorten the processing time required for the comparison. It is possible to minimize the time required for drawing and reading the determination image, and to minimize the load on the CPU 10 and the bus load that are required for executing the determination.

The vehicle device 1 sets at least one determination region 52 at a fixed position in the invisible region 50a. Accordingly, it is not necessary to determine where the determination region 52 is to be set, and it is possible to simplify the processing.

In the vehicle device 1, at least one determination region 52 is set at a randomly set position in the invisible region 50a. Accordingly, even when the content reaches the outer edge of the frame buffer 50, the determination region 52 can be secured. In this case, the determination region 52 in which the position is fixed and the determination region 52 in which the position is randomly set can coexist.

Second Embodiment

Next, a second embodiment will be described. Modifications to the first embodiment will be described in the second embodiment.

First Example

Figure 14:
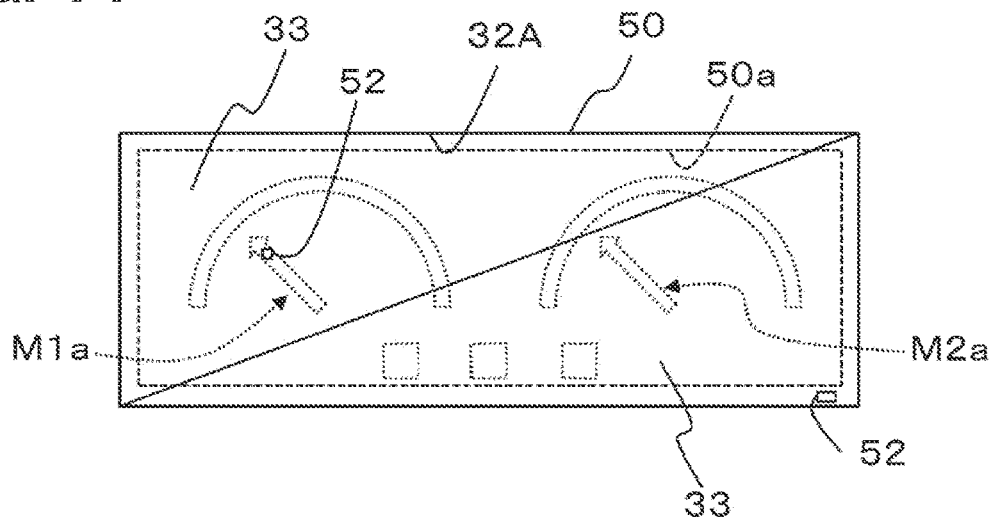
FIG. 14 is one diagram showing a setting example of a determination region according to a second embodiment.

Although an example in which the determination region 52 is set in the invisible region 50a has been described in the first embodiment, a vehicle device 1 can set at least one determination region 52 outside of the invisible region 50a, that is, at a position visible to the user, as shown in FIG. 14, for example.

However, in this case, the vehicle device 1 sets the determination region within a region where a mode (a manner) of displaying a content changes. The vehicle device 1 sets the determination image so that the image has a color and a size corresponding to the content.

For example, when the content is displayed in a manner of scrolling or rotating, it is considered that the color changes at a certain position between the content drawn last time and the content drawn this time. Then, it is possible to use the portion in which the color changes between the previous time and the current time to determine whether the frame buffer 50 has been correctly updated, as described in the first embodiment. For example, in the case of a meter display 2, it is considered that a needle image M1a schematically indicated by a dashed line is highly likely to have a different display mode.

Therefore, the vehicle device 1 sets the determination region 52 within a region where the needle image M1a is drawn, and draws the determination image alternately with the color of the needle image M1a and a background color. Accordingly, it is possible to determine whether the frame buffer 50 has been correctly updated, and the same advantages as those according to the first embodiment can be attained. For example, it is possible to determine whether the entire screen has been updated while restricting the processing time. In this case, it is not necessary to set all the determination regions 52 outside of the invisible region 50a, and some of the determination regions 52 may be set within the invisible region 50a.

In a case in which the content is scrolled or rotated, it is possible to obtain information of the content from the application 21, and to compare a part of the content drawn last time to a part of the content drawn this time. In other words, the content itself drawn by the application 21 can be used as the determination image. With such a configuration, the same advantages as those according to the first embodiment can be attained. For example, it is possible to determine whether the entire screen has been updated while restricting the processing time.

Second Example

Figure 15:
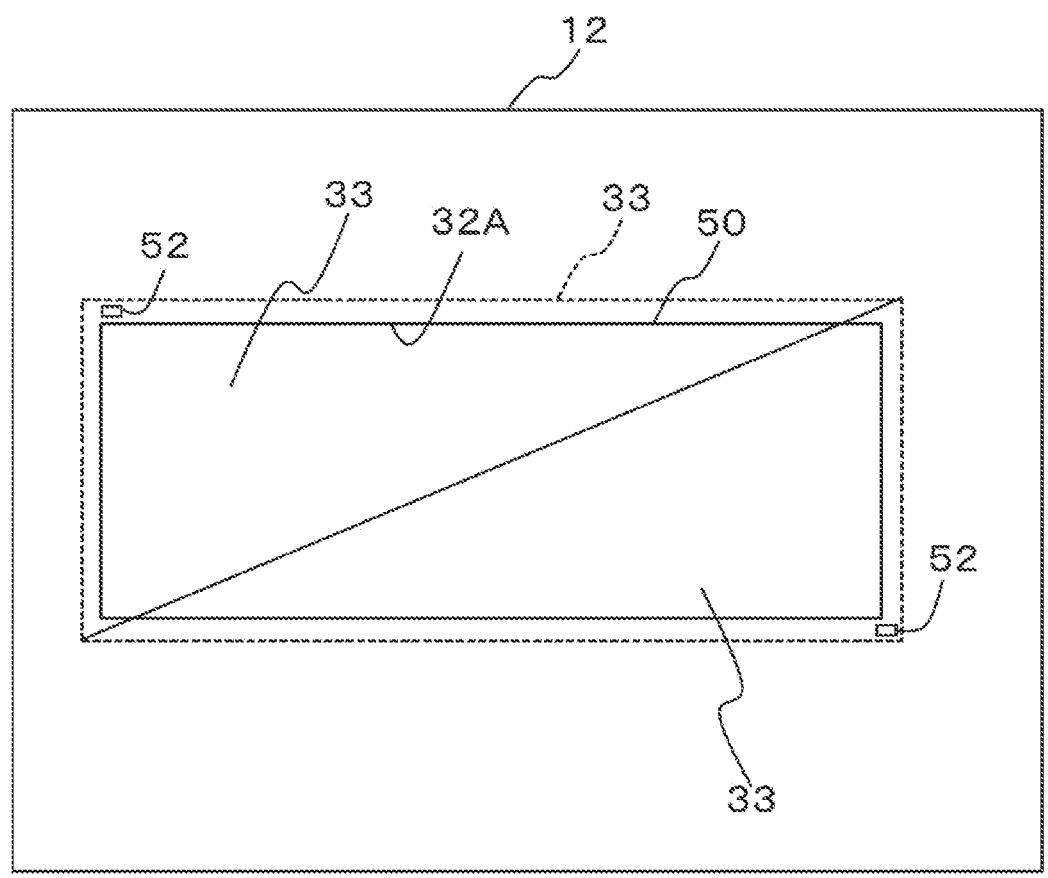
FIG. 15 is another diagram showing the setting example of the determination region.

In the first embodiment, an example has been described in which the determination region 52 is set in the region of the frame buffer 50, but as shown in FIG. 15, the vehicle device 1 can set at least one determination region 52 in a region outside of the frame buffer 50 in a main memory 12. In this case, the vehicle device 1 sets the pasting region 32 in a size larger than that of the frame buffer 50, and sets the determination region 52 in each unit region 33.

With such a configuration, by comparing the determination images drawn in the determination region 52 to each other, the same advantages as those according to the first embodiment can be attained. For example, it is possible to determine whether the entire screen has been updated while restricting the processing time.

Since the determination image is drawn outside of the frame buffer 50, it is possible to prevent the determination image from being visible to a user at a certain angle in a display device in which the bezel 2a is fairly narrow (so-called a bezel-less display). For example, when a head-up display 4 adopts a projection method, it is particularly significant to set the determination region 52 at such a position. Even in a display device employing a liquid crystal panel or an organic EL panel, it is possible to set the determination region 52 outside of the region of the frame buffer 50.

Third Example

Figure 16:
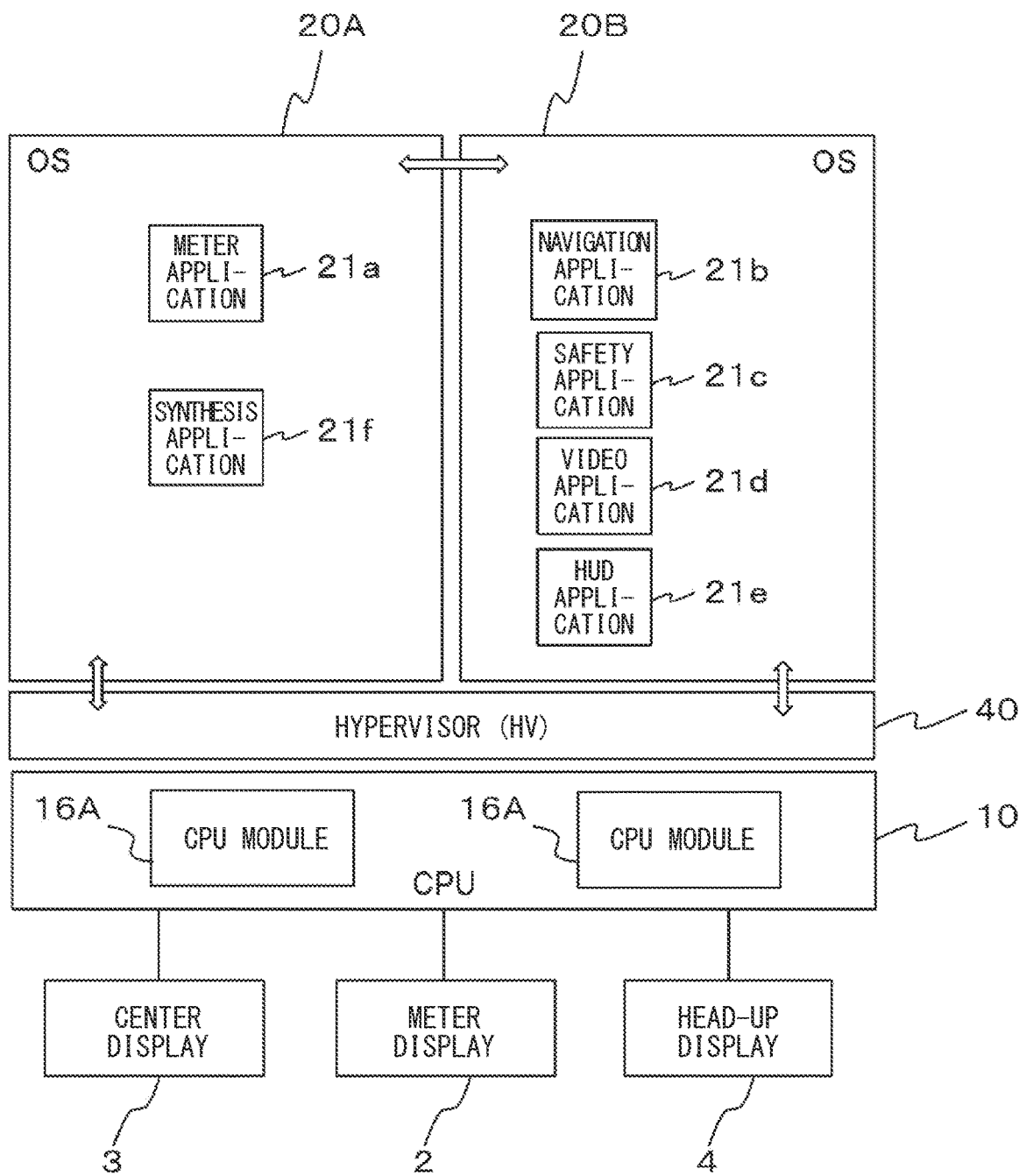
FIG. 16 is one diagram showing another configuration example of the vehicle device.

In the first embodiment, although the configuration example in which one OS 20 is implemented on the vehicle device 1 has been described, the vehicle device 1 may have a different configuration. For example, as shown in FIG. 16, in the vehicle device 1, a hypervisor 40 is executed on a CPU 10, and multiple, for example, two OSs 20A and 20B are executed on the hypervisor 40.

At this time, an OS 20A is allocated to the CPU module 16A, and an OS 20B is allocated to a CPU module 16B. In the present embodiment, it is assumed that the OS 20A is in charge of processing requiring relatively high real-time processing, and the OS 20B is in charge of processing requiring relatively low real-time processing.

For example, in the OS 20A, for example, the meter application 21a or synthesis application 21f that requires real-time processing is executed, and in the OS 20B, a navigation application 21b, a safety application 21c, a video application 21d, an HUD application 21e, and the like that do not require real-time processing as much as the OS 20A are executed. The type and the number of the OS 20 and the arrangement of the applications 21 are merely examples, and the present invention is not limited thereto.

With such a configuration, the same advantages as those according to the first embodiment can be attained. For example, it is possible to determine whether the entire screen has been updated while restricting the processing time. In this case, the hypervisor 40 can be executed as a function of the OS 20A. That is, the OS 20A can be executed on the CPU 10, the hypervisor 40 can be operated as a function of the OS 20, and the OS 20B can be executed on the hypervisor 40.

Figure 17:
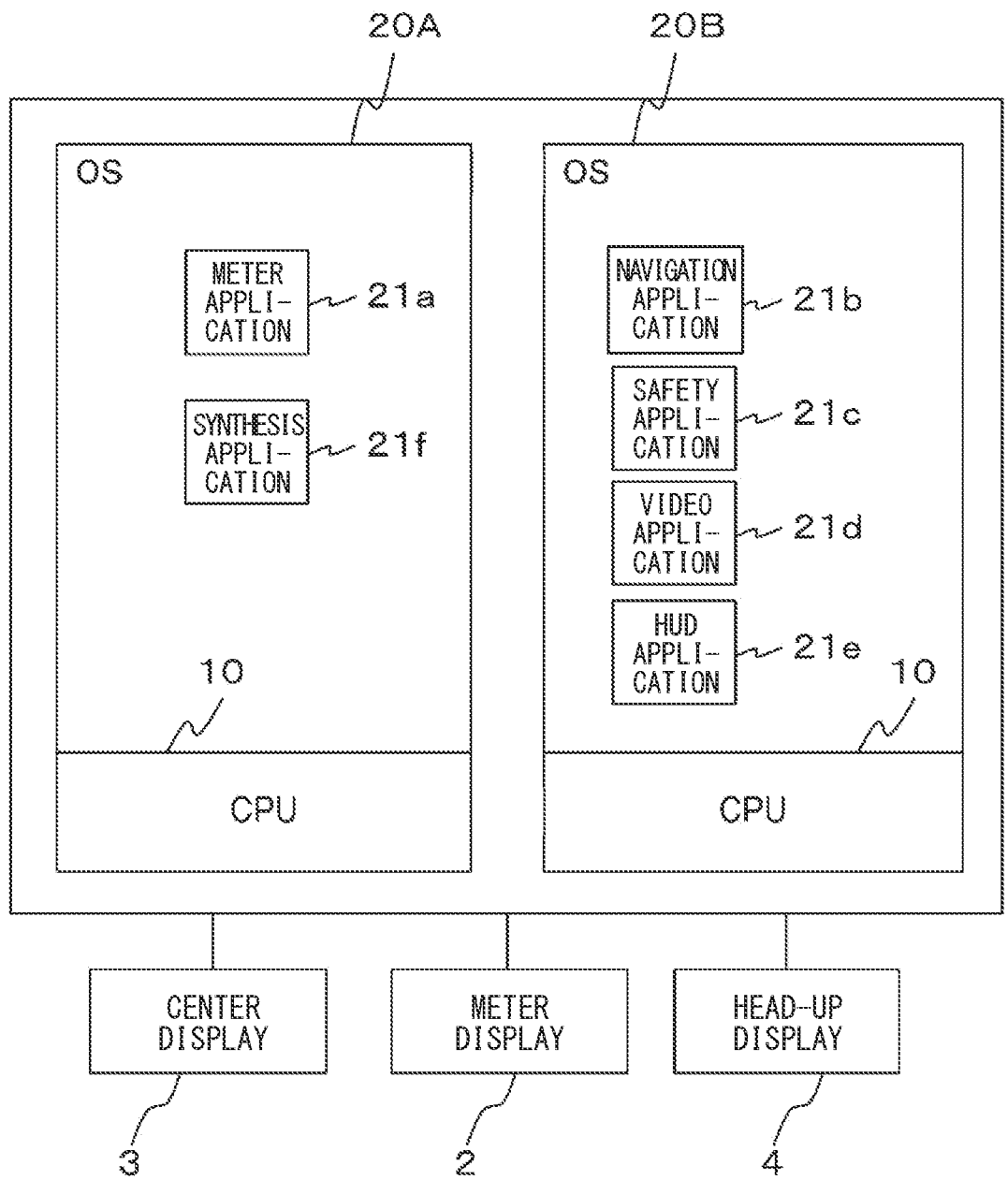
FIG. 17 is another diagram showing the other configuration example of the vehicle device.

Alternatively, as shown in FIG. 17, the vehicle device 1 can also include multiple CPUs 10, and each of the OS 20A and the OS 20B can also be executed on a respective one of the CPUs 10. In this case, similarly, in the CPU 10A, for example, the meter application 21a or the synthesis application 21f that requires the real-time property is executed, and in the CPU 10B, the navigation application 21b, the safety application 21c, the video application 21d, the HUD application 21e, and the like that do not require the real-time property as much as the CPU 10A side are executed. The number of the CPU 10 and the arrangement of the applications 21 are merely examples, and the present invention is not limited thereto.

With such a configuration, the same effects as those according to the first embodiment can be attained. For example, it is possible to determine whether the entire screen has been updated while restricting the processing time.

Although the present disclosure has been described in accordance with the examples, it is understood that the present disclosure is not limited to the embodiments and the structures. The present disclosure includes various modifications and deformations within an equivalent range. In addition, various combinations and forms, and further, other combinations and forms including only one element, more than one element, or less than one element are also included in the scope and spirit of the present disclosure.

The control units and methods thereof described in the present disclosure may be implemented by a dedicated computer provided by constituting a processor and a memory that are programmed to execute one or more functions embodied by a computer program. Alternatively, the control units and the methods thereof described in the present disclosure may be implemented by a dedicated computer provided by constituting a processor by one or more dedicated hardware logic circuits. Alternatively, the control units and the methods thereof described in the present disclosure may be implemented by one or more dedicated computers constituted by a combination of a processor and a memory that are programmed to execute one or more functions and a processor constituted by one or more hardware logic circuits. The computer program may also be stored in a computer readable non-transitory tangible recording medium as a computer executable instruction.

The invention claimed is:

1. A vehicle device connected to a display device, the vehicle device comprising:
   a graphic processing unit configured to draw a content based on a drawing request from an application program;
   a synthesizer configured to paste the drawn content to a frame buffer that is provided corresponding to the display device; and
   a determiner configured to determine whether the frame buffer has been updated, wherein
   the synthesizer is further configured to:
     set a pasting region to be pasted to the frame buffer;
     divide the set pasting region into triangular unit regions; and
     cause the graphic processing unit to execute processing of pasting each of the unit regions to the frame buffer, and
   the determiner is further configure to:
     set a determination region in the pasting region;
     prepare a determination image to be drawn in the determination region;
     request the graphic processing unit to draw the prepared determination image;
     read the determination image that is actually drawn in the frame buffer by the graphic processing unit; and
     determine that the frame buffer has been updated when the prepared determination image matches the read determination image.

2. The vehicle device according to claim 1, wherein the determiner is further configured to set the determination region within a region of the frame buffer that is not visible to a user when displayed on the display device.

3. The vehicle device according to claim 2, wherein the region that is not visible to the user when displayed on the display device is a region corresponding to a portion covered by a bezel disposed on the display device.

4. The vehicle device according to claim 1, wherein the determiner is further configured to set the determination region with one pixel.

5. The vehicle device according to claim 1, wherein the determiner is configured to set the determination image as an image having at least one of a position, a size, and a color that is different from that of an image that was set at a previous time.

6. The vehicle device according to claim 1, wherein the determiner is configured to set the determination region within a region of the frame buffer where a manner of displaying a content changes.

7. The vehicle device according to claim 1, wherein the determiner is configured to set the determination region outside of the frame buffer.

8. The vehicle device according to claim 1, wherein the determiner is configured to set the determination region at a fixed position.

9. The vehicle device according to claim 1, wherein the determiner is configured to set the determination region at a position that is randomly set.

10. A control method of a vehicle device connected to a display device, the method comprising:
- setting a pasting region to be pasted to a frame buffer, the pasting region being a region including a content drawn by an application program;
- dividing the pasting region into triangular unit regions;
- pasting each of the unit regions to the frame buffer by a graphics processing unit;
- preparing a determination image to be drawn in a determination region that is set in the pasting region;
- drawing the prepared determination image in the frame buffer by the graphics processing unit;
- comparing the prepared determination image to the determination image that is actually drawn in the frame buffer; and
- determining that the frame buffer has been updated when the prepared determination image matches the determination image actually drawn in the frame buffer.

* * * * *